(12) United States Patent
Tannenbaum et al.

(10) Patent No.: US 7,701,360 B1
(45) Date of Patent: Apr. 20, 2010

(54) SYSTEM AND METHOD FOR SELECTIVE NAVIGATION TRACKING

(75) Inventors: David H. Tannenbaum, Dallas, TX (US); Mary C. Tannenbaum, Dallas, TX (US)

(73) Assignee: Union Beach L.P., Dallas, TX (US)

(*) Notice: Subject to any disclaimer, the term of this patent is extended or adjusted under 35 U.S.C. 154(b) by 0 days.

(21) Appl. No.: 12/143,715

(22) Filed: Jun. 20, 2008

Related U.S. Application Data

(62) Division of application No. 11/200,730, filed on Aug. 10, 2005, now Pat. No. 7,412,325.

(51) Int. Cl.
*G08G 1/09* (2006.01)

(52) U.S. Cl. ............. 340/905; 340/539.13; 340/995.13; 701/208; 701/213

(58) Field of Classification Search ............... 340/601, 340/905, 995.1–995.27, 539.13; 701/208–213
See application file for complete search history.

(56) References Cited

U.S. PATENT DOCUMENTS

| | | | |
|---|---|---|---|
| 5,724,243 A | 3/1998 | Westerlage et al. | |
| 5,729,214 A * | 3/1998 | Moore | 340/905 |
| 5,905,450 A | 5/1999 | Kim et al. | |
| 5,908,465 A | 6/1999 | Ito et al. | |
| 5,941,930 A | 8/1999 | Morimoto et al. | |
| 6,278,941 B1 | 8/2001 | Yokoyama et al. | |
| 6,281,807 B1 * | 8/2001 | Kynast et al. | 340/905 |
| 6,314,365 B1 | 11/2001 | Smith | |
| 6,347,278 B2 | 2/2002 | Ito et al. | |
| 6,356,839 B1 | 3/2002 | Monde et al. | |
| 6,504,503 B1 | 1/2003 | Saint-Hilaire et al. | |
| 6,535,743 B1 | 3/2003 | Kennedy, III et al. | |
| 6,603,405 B2 * | 8/2003 | Smith | 340/905 |
| 6,735,516 B1 | 5/2004 | Manson | |
| 6,898,521 B2 | 5/2005 | Yanai et al. | |
| 6,937,869 B1 | 8/2005 | Rayburn | |
| 7,463,973 B2 * | 12/2008 | Okude et al. | 701/202 |
| 2003/0225516 A1 * | 12/2003 | DeKock et al. | 701/214 |
| 2004/0021569 A1 | 2/2004 | Lepkofker et al. | |

FOREIGN PATENT DOCUMENTS

WO  WO-2005/001386 A2  1/2005

* cited by examiner

*Primary Examiner*—Brent Swarthout
(74) *Attorney, Agent, or Firm*—Fulbright & Jaworski L.L.P.

(57) ABSTRACT

There is disclosed systems and methods for controlling communication of navigation positioning information from a source of said information to another device for tracking purposes. In one embodiment, a user having a communicating device that maintains a record of its present location establishes a communication link to one or more selected targets and then grants permission to his/her device to continually send updates of his/her device's position to said selected other devices. These updated communications can be on a data channel of a voice communication device if desired. In one embodiment, said receiving device can deliver said coordinates (translated into street locations if desired) in an audio fashion, or said receiving device can visually display (perhaps on a grid overlay) said position of said sending device or environmental data from said sending device.

9 Claims, 4 Drawing Sheets

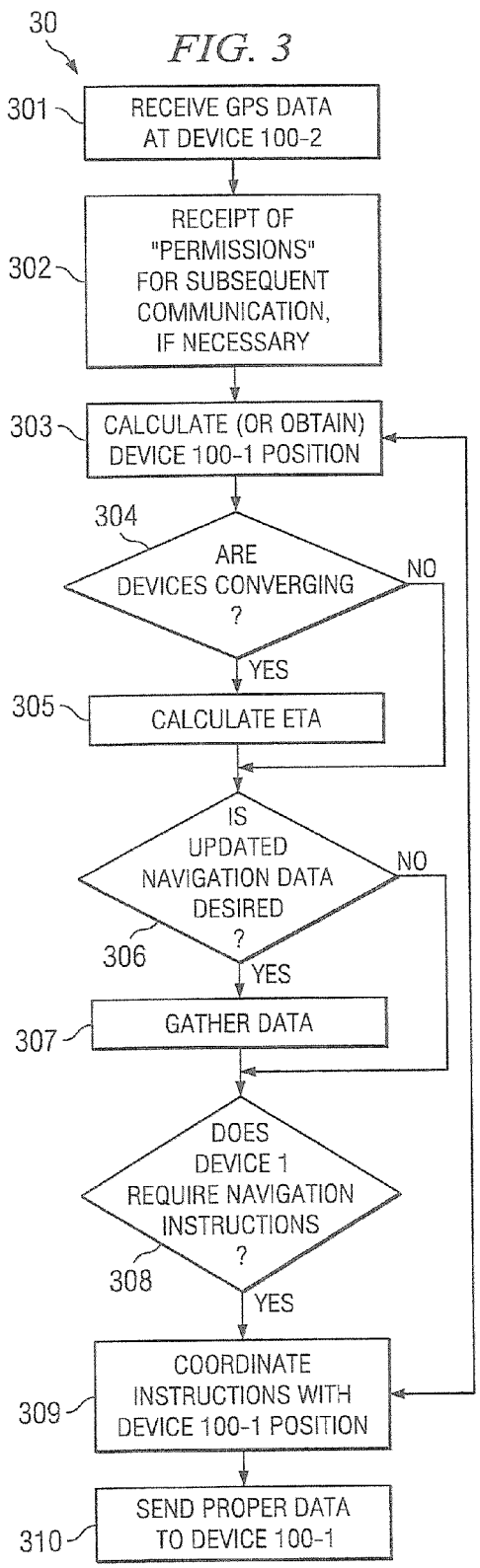
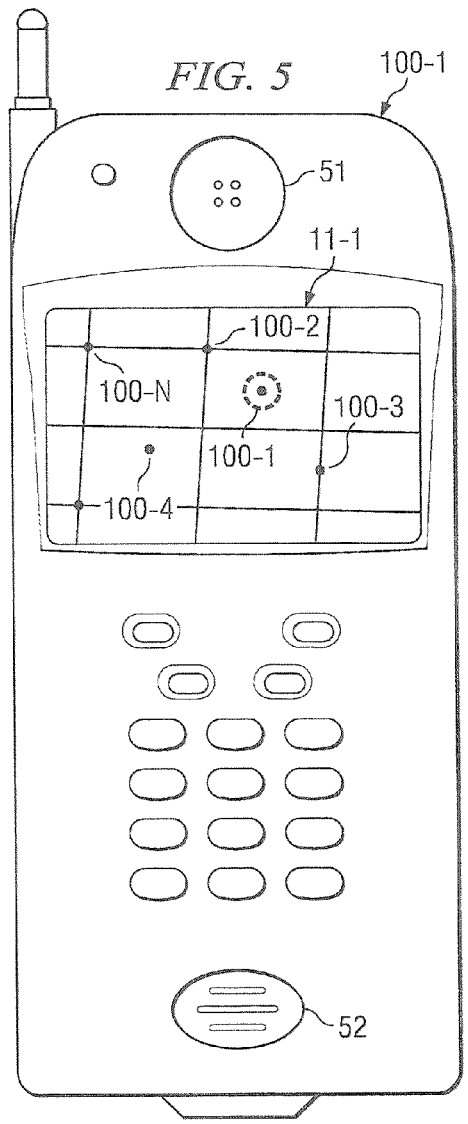

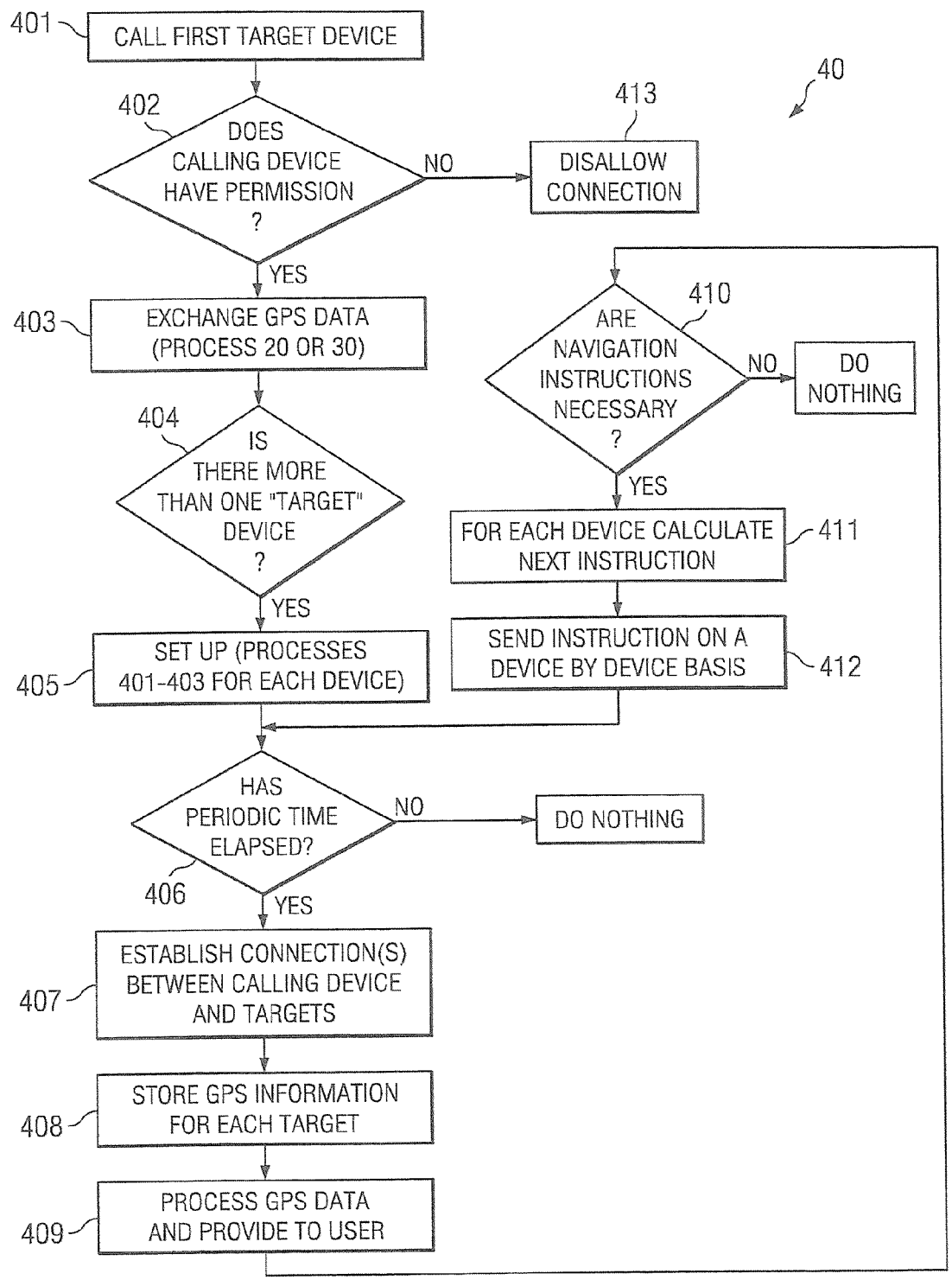

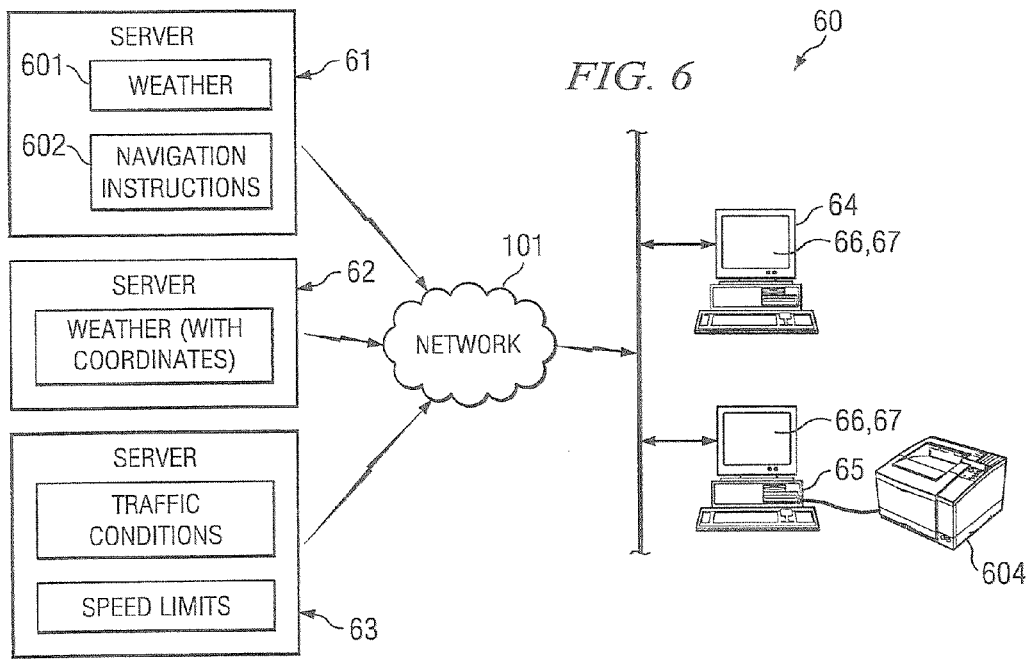
FIG. 6
FIG. 6A
| LOCATION | TIME | WEATHER | TEMP | TRAFFIC CONDITIONS |
|---|---|---|---|---|
| DALLAS | 8:00 AM | CLEAR | 80° | CONGESTED |
| WACO | 9:30 AM | CLOUDY | 85° | CLEAR |
| AUSTIN | 11:00 AM | SHOWERS | 90° | SLOW |
| SAN ANTONIO | 12:30 PM | RAIN | 95° | ACCIDENT |
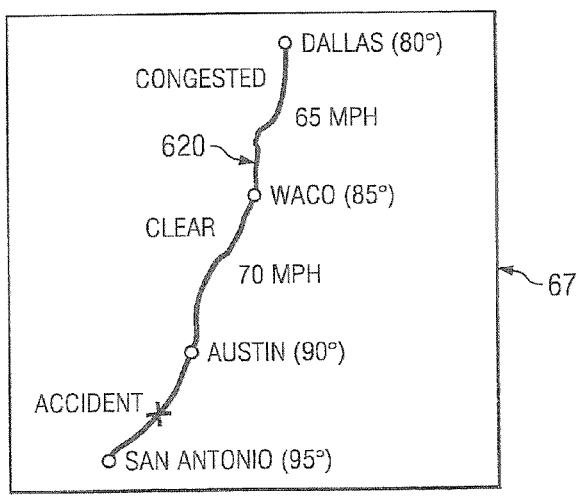
FIG. 6B

SYSTEM AND METHOD FOR SELECTIVE NAVIGATION TRACKING

CROSS-REFERENCE TO RELATED APPLICATIONS

This application is a divisional of and claims priority to U.S. patent application Ser. No. 11/200,730, titled SYSTEM AND METHOD FOR SELECTIVE NAVIGATION TRACKING, filed Aug. 10, 2005, now U.S. Pat. No. 7,412,325 hereby incorporated by reference herein. This application is related to copending U.S. patent application Ser. No. 12/143,715 titled SYSTEM AND METHOD FOR NAVIGATION TRACKING OF INDIVIDUALS IN A GROUP, filed concurrently herewith, hereby incorporated by reference herein.

TECHNICAL FIELD

This invention relates to the transmission of GPS tracking information and more particularly to systems and methods for permissive navigational tracking where the sending party selectively transmits navigation data to a receiving party over a period of time.

BACKGROUND OF THE INVENTION

It is now well-know that mobile devices of all types, such as cell phones PDAs, computers and even motor vehicles, have GPS and other navigational systems built into them. Thus, it is possible for such mobile devices to transmit their current location to remotely located devices. Accordingly trucking companies install GPS (or other positional determination systems) in vehicles and have those vehicles continually report their position to a central location. It is also known to plant a tracking device in a car (or on a person) in order to track the movement of the car or person.

Currently, however, there is not a system for allowing a user who has a navigational positioning system to electronically communicate his/her location to a selected other device. Nor is there a system to allow a receiving device or user to provide return navigational assistance to a sending device.

BRIEF SUMMARY OF THE INVENTION

There is disclosed systems and methods for controlling the communication of navigation positioning information from a source of the information to another device for tracking purposes. In one embodiment, a user having a communicating device that maintains a record of its present location establishes a communication link to one or more selected targets and then grants permission to his/her device to continually send updates of his/her device's position to the selected other devices. These updated communications can be on a data channel of a voice communication device if desired.

In one embodiment, the receiving device can deliver the coordinates (translated into street locations if desired) in an audio fashion, or the receiving device can visually display (perhaps on a grid overlay) the position of the sending device or environmental data from the sending device.

In one embodiment, when the sending device is converging on the receiving device, the receiving device can display the ETA of the sending device.

In one embodiment, the receiving device can either present its own coordinates to the sending device so that the sending device can calculate route information to facilitate the sending device moving toward the receiving device, or the receiving device can calculate and communicate information to the receiving device to guide (perhaps on a turn by turn basis) the receiving device.

In still another embodiment, a plurality of receivers can interact such that one or more of the receivers can maintain the position of all of the other devices so that the user at any of the devices can provide navigational assistance to the other devices.

In still other embodiments, various environmental devices can transmit to a mobile device's navigation system environmental data for presentation on the display in accordance with the coordinates, or anticipated coordinates of the mobile device In one embodiment, the environmental transmitters can adjust the data to suit the time of arrival of a mobile device at a certain location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 2, 3 and 4 show embodiments of processes for the exchange of continuing navigation information between mobile devices;

FIG. 5 (shown opposite FIG. 3) illustrates one embodiment of the display of positioning information for a plurality of mobile device in accordance with the concepts taught by the invention; and FIGS. 6, 6A, and 6B illustrate one embodiment of environmental data being delivered for navigational use based on location.

DETAILED DESCRIPTION OF THE INVENTION

Figure 1:
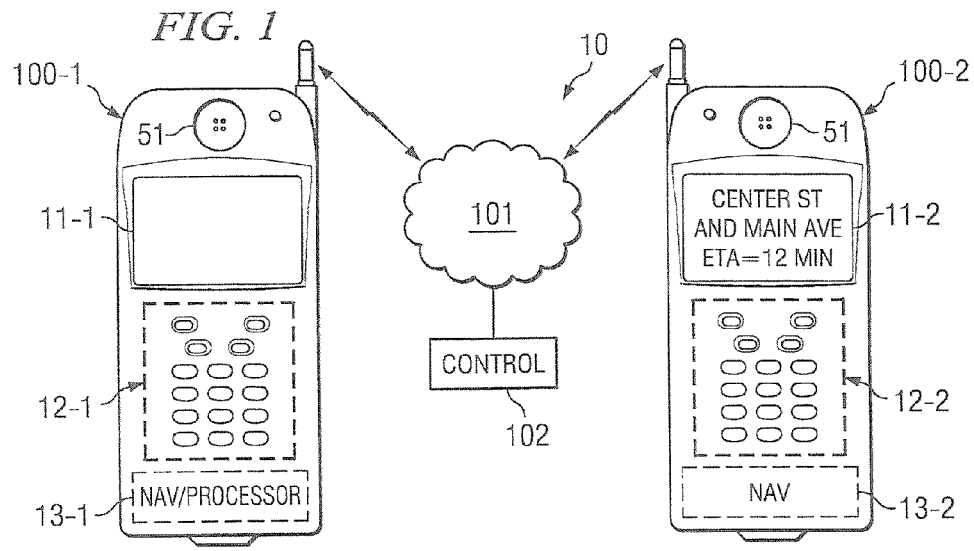
FIG. 1 illustrates one embodiment of the invention in which two mobile devices exchange navigational information.

FIG. 1 illustrates one embodiment 10 of the invention in which two mobile devices (100-1 and 100-2) exchange navigational information via public network 101, which network can be, for example, a cellular network, (perhaps having a land line to one of the devices), or a non-cellular wireless network, or combinations thereof. Note that while only two devices are shown, the system is designed for communications among any number of devices, some of which are mobile and, if desired some of which may be fixed in location. Also note that the mobile devices shown in FIG. 1 are telephones. However, the system works for any type of mobile device, such as devices in a car, boat, plane, computer, PDA, navigation, etc.

Devices 101-1 and 101-2 have, for example, displays 11-, keypads 12-, and a geographical position determination mechanism, such as navigation device 13-. One device for determining geographical position is by using a well-known GPS navigation system for determining geographical coordinates from satellite transmissions. Another mechanism for having a mobile device "know" its geographical location is by using data from the cellular network itself based upon triangulation, or other methods, employed for such determinations.

As will be seen from that which is to follow, the concepts taught herein can be used to effectively allow a mobile device that only "knows" its own location but does not have built-in navigation capability to be used for providing navigational instructions to a user. As will be seen, these navigational instructions are processed and created, at least in part, from a remote device and communicated to the user via the user's own device.

Also, as will be discussed, a mobile device having full navigation capability can have its routing information updated, either permanently or temporarily, from a target destination. Also, again as will be discussed, one or more locations remote from a device, may, once permission is granted, monitors the navigational progress of a target device.

Figure 2:
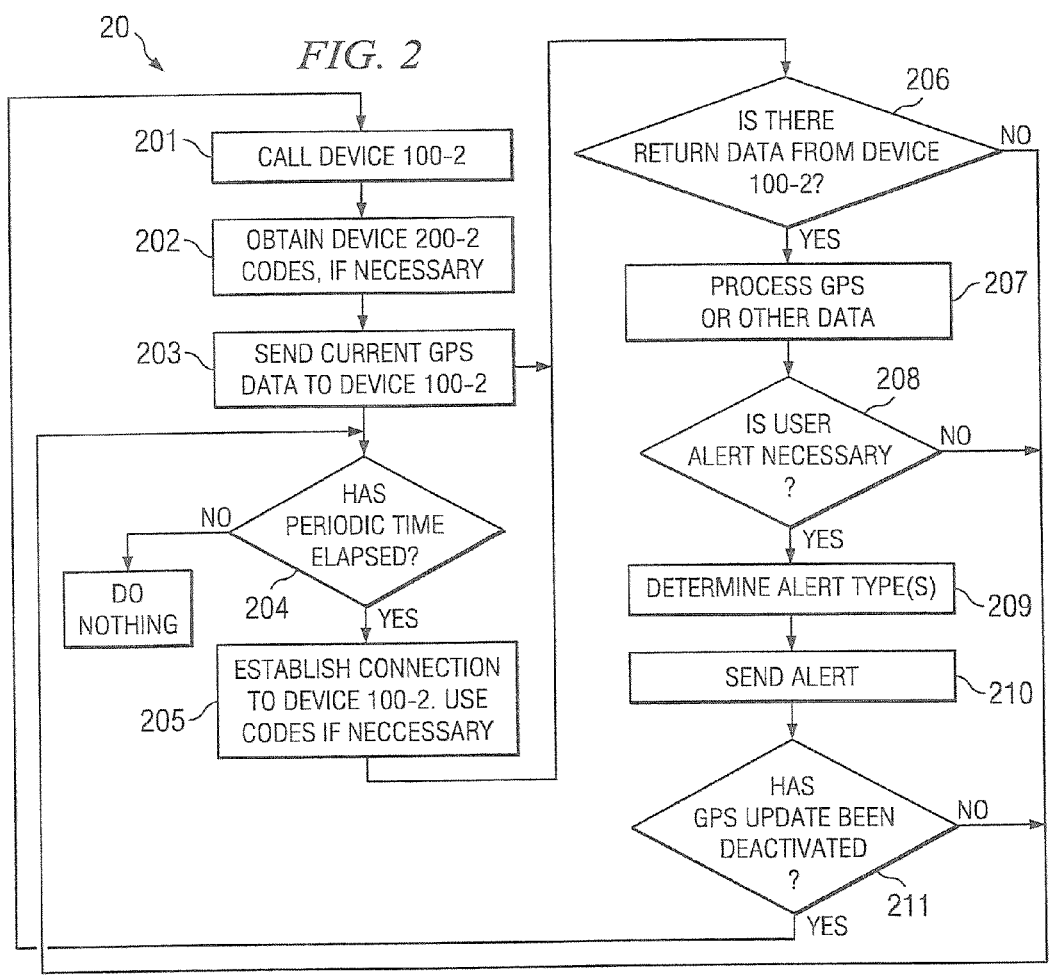

FIG. 2 shows one embodiment 20 of a process for the exchange of continuing navigation information between mobile devices. Process 201 controls the selection by a mobile device, such as mobile device 201-1 (FIG. 1), of a target or receiving device, such as device 100-2 (FIG. 1). Once the connection is established, the devices exchange protocol codes and permissions (if necessary) so that, if desired, at a future time one or either of the devices can establish communications with the other via a data exchange network without the traditional ringing, manual answering, etc. In one embodiment, this data exchange can be via an email network or via a Switched Multi-megabit Data Service (SMDS) network (with or without the SMDS Interface Protocol (SIP)) using data packets for the delivery of positional and navigation messages.

In the embodiment of FIG. 1, device 100-1 sends its current geographical position, as controlled by process 203, to device 100-2. After this initial set-up (which would be dispensed with if protocols and other permissions had already been granted), processes 204 and 205 continue to control the exchange of data between devices 100-1 and 100-2.

Process 206 determines if there is to be a data return from device 100-2. If there is not, the iteration continues. If there is, then device 100-1 processes, to the limits of its own capability via process 207, the data arriving from device 100-2. This data can be, for example, the current geographical position of device 100-2, or it can be updated navigation data pertaining to the location of device 100-2, or it can be instructions for allowing a user at device 100-1 to find his/her way to converge on device 100-2, or it can be environmental data as discussed with respect to FIGS. 6, 6A, and 6B.

The data received can be, for example, navigation data from a certain position (for example, the position of device 100-1) to another position, such as to the location of device 100-2 or to a location specified by the communication from device 100-1. In one embodiment, only a single instruction is communicated to device 100-1 from a navigational application located at device 100-2. This instruction could be, for example, turn right at the next intersection or it could be the geographical (or map) coordinates of a specified destination. Each time device 100-1 reports its position to device 100-2, device 100-2 could respond with a new navigation instruction, or set of instructions. Alternatively, or in combination, device 100-2 can download to device 100-1 a set of data that then would allow the processor and applications running in device 100-1 to calculate a series of instructions, such as navigational instructions.

In one example of this operation, if device 100-1 has an ability to know its own location but no ability to provide navigation instructions to a user at the device, then the target device, upon receipt of the most current location of device 100-1 can provide to device 100-1 a navigation instruction, such as, turn right in one-half mile onto Round Street and proceed three miles on Round Street. This could be a single instruction or a set of instructions and could be, if desired, stored directly in device 100-1. Processes 208, 209 and 210 then provide the alert information to the user at device 100-1 based on the proper alert type for device 100-1.

Continuing with this example, after a period of time, as controlled by process 204, (which time could be variable depending upon, for example, the closeness to a decision point, perhaps as communicated from device 100-2) device 100-1 again provides, if desired, geographical data to device 100-2 and device 100-2 can then again provide updated navigation instructions. These instructions can be provided audibly to the user at device 100-1 via transducer 51, (FIG. 1) or could be displayed on screen 11-1, or both.

Using the system and method described herein, a person with a wireless device can establish a communication link to a selected other party, (such as, for example, a restaurant). Once the communication link is established the calling party's device communications, either audibly, or perhaps by SMAS message, to the called party a desire for directions. The called party's device can then send one or more different types of return messages. The simplest message would be the return of a coordinate of the restaurant. Note that this coordinate could have been sent by a third party if desired. Once the coordinate is received by the original calling party, navigational processing within the calling device calculates navigation instructions to the calling party.

If the calling party's device does not contain navigation processing capability then the called party could send a list of navigational instructions based upon the correct position of the calling party. These navigational instructions are then made available to the calling party. As will be seen with respect to FIGS. 6, 6A, and 6B, the return message from the called device can be environmental data pertaining to navigational routing.

At some point, the interchange of information is concluded and process 211 controls the flow so that the system is ready for the next communication exchange. Note, that the discussion only dealt with communications between two devices but many communications could occur simultaneously involving devices 100-1 and 100-2. As discussed, the data sent to device 100-1 could be as simple as an address a coordinate position or as complex as an entire navigational overlay for a geographical area. The address information would be helpful, for example, if device 100-1 had a full navigational system but the user did not know a destination address. In such a case, device 100-2 could input an address directly into device 100-1 as a destination and device 100-1 would then communicate the proper routing. One method of entering an address is to allow the sender to simply dial (or have preloaded) the address into a telephone and the address would load directly in the navigation system of the receiving party. In one embodiment, the receiving party could provide an access code (or an address, such as an internet address, to the sending party who could then download data directly into the navigation device of the receiving party.

FIG. 3 shows an embodiment 30 for the exchange of continuing navigation information between mobile devices. Process 301 receives GPS data pertaining to device 100-1. In the context of this application, GPS data is data pertaining to the current location of a device without regard to how that location was determined.

Process 302, if necessary, receives (or sends) whatever permissions it will require to continue to obtain GPS data from device 100-1. Process 303 uses the received GPS data to calculate the position of device 100-1. Optionally, process 304 determines if the two devices are converging. If they are converging, then an ETA is calculated, if desired, via process 305 and communicated to the user of device 100-2, and if desired to the user at device 100-1. If the devices are not conversing then, if desired, an ETA could be established to a destination established by the calling device.

Process 306 determines if there is updated navigation (or environmental) data desired from device 100-1. If there is, then process 307 gathers the data. This gathering can be by establishing a communication path to device 100-1 using, if necessary, the permissions granted in process 302, or this gathering can be by obtaining the current location of device 100-1 from a third party source, such as for example, from a cellular network, again based on permissions given by device 100-1, if desired. These permissions can be either delivered via device 100-2 or delivered directly from device 100-1 to the third party.

Process 308 determines if device 100-1 requires navigational and/or environmental instructions or data, and if so, process 309 coordinates the delivery of such instructions in cooperation with the capabilities of device 100-1 and/or devices 61, 62, and 63 (FIG. 6). Process 310 sends the proper data to device 100-1 and/or to any other device requiring such data.

Using a third party, such as cellular network control 102 (FIG. 1) process 30 (or process 20) could receive all navigational positional data pertaining to device 100-1. Process 30 (or 20) would then respond to this data by providing navigational instructions to device 100-1. Thus, device 100-1 need not even have the capability therein to know its own geographical location and, using data supplied as needed from an external source, can supply navigational instructions to a user of the device.

FIG. 4 illustrates one embodiment 40 of a process for keeping track of multiple other wireless devices, such that process 401 establishes a communication link to the first target device. If process 402 determines that permission for exchanging data has not been granted (and is needed), the connection is terminated via process 413. If permission has been granted, then process 404 determines if more than one target devices are to be added on. If so, processes 401-403 are repeated until all the targets have reported their current geographical positions. Note that the positions can be sent from the target devices, as discussed above, or from a third party, also as discussed above, or could be input by the user of the target device. If the location information is input as a coordinate (or street address) the receiving device would process the information and store it in the same manner as if the data had come from, for example, a GPS device in the target.

Process 406 controls the elapsing of periodic time intervals after which process 407 establishes connections, either all at once in conference style or, preferable serially, to each of the targets. Process 408 stores the gathered GPS information from the targets and the gathered data is processed under control of process 409. Process 409 provides the information to the user at the calling device, for example as shown in FIG. 5 where the current positions of a plurality of targets 100-2, 100-3, 100-4, 100-N are displayed on display screen 11-1 of cellular device 100-1 together with the position of calling device 100-1, all on screen 11-1 of device 100-1. In this manner, a person, such as a group leader at device 100-1, can keep track of a group of people, much as an air traffic controller keeps track of a plurality of airplanes. This would work well for teachers with their class, scout leaders or trip guides, where all the participates have cell phones or at least GPS sending devices.

If navigational instructions are necessary, process 410 in conjunction with processes 411 and 412 prepare and send the proper instructions to each target device. The navigational instructions can be such that they operate to converge the target device with the master device as discussed above.

Note that in process 40, the calling (or master) device established the communication links with the target devices. The system and methods discussed herein can work in the reverse or by using a combination of directional initiations or can work with the GPS data coming from a third party as discussed above.

Processes 20, 30 and 40 would be designed to work as applications running on a processor within a mobile device, such as a cell phone.

FIGS. 6, 6A and 6B illustrate one embodiment 60 of a system for displaying both navigational routing data, such as route 620 (FIG. 6B) shown displayed on display 67 of navigational device 64 (FIG. 6), and environmental data superimposed on the navigational data. The environmental data could be, for example, weather forecast, current weather conditions, speed limits, special speed limits, current traffic conditions, statistical traffic conditions, etc.

In the embodiment shown in FIG. 6, server 61 contains both navigational instructions 602 and weather data 601. This data can be communicated to a mobile navigational device, such as device 64 preferably a wireless connection via network 101 or to a CPU, such as CPU 65, preferably by a wireline connection. Note that the cellular network can be used or any wireless protocol, including a point to point protocol such as Bluetooth, etc. or could be RFID or near-field transmission or even bar code generated, for example by codes printed on signs or on the roadway. The source for the data can be in one location, such as server 61 or in multiple locations, such as servers 62 and 63, or from individual sending devices or read from other coding, and in any case need not be delivered all at one time. The environmental data could be delivered based on the present or future anticipated geographical location of the navigation device or of the geographical position of the user of the provided information.

Once the server, or other sending device, having environmental data obtains the geographical position of the navigation device (such as device 64), or the proposed geographical position of the user, the proper environmental data can be sent to the device adjusted for the geographical location and if desired, the ETA of the user at the geographical location. This can be accomplished in any one of a number of ways, such as, for example, comparing the position (or estimated position or time) of the device with the stored locations of the environmental data. This then will allow for the adjustment of data for time or location or both.

One or more of devices 61-63 can be mobile and, as discussed, can be individual sending devices, each having one piece of information (such as a speed limit) or a multiplicity of information.

FIG. 6A shows one example of display 66 showing various locations along a navigational route with ETAs of arrival at each location (these need not be displayed, but are used for calculation purposes for other displayed data). The chart shows weather, temperature and traffic conditions as examples of environmental conditions at various points along the trip.

In one embodiment, the geographical route can be printed, for example, by printer 604 (FIG. 6) working in conjunction with computer 65. In such case, the displayed routing could appear as shown in FIG. 6B. The display could be a routing listed by road segments and turns. This would be the navigational data. Overlaid on the navigational data would be the environmental data, such as the anticipated weather at certain points along the trip. This weather data would, if desired, be adjusted for time of arrival at each point. This would require either a live update during the trip or an input of the beginning time of the trip. The system could calculate the time to each point (using the posted speed limits) or the system could accept an input from the user as to the anticipated speed along a route. In this manner, a user planning a trip could see the weather along the trip and could adjust the starting time, a layover time or the user could change the route.

The sending device, or a plurality of sending devices, could send data pertaining to a variety of environmental conditions. This data could be sent at the request of the system sending the navigational data or could be sent at the request of the user by imputing the geographical position of the user or of a starting position. As discussed, this data can adjusted for the ETA of the user at the various points along the route.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a navigational display, said method comprising:

displaying on a navigation display a navigation routing of a trip having a plurality of points along said routing;

receiving data under control of a processor associated with said display from at least one transmitting device remote from said navigation display, said transmitting device being an environmental sensor positioned at ones of said points and operable for sending environmental data pertaining to a point where said sensor is positioned, said received data from each said device pertaining to environmental conditions at said point of each said device, said received data containing, in addition to said environmental condition data, geographical position data corresponding to said location of each said device; and overlaying under control of said processor said received environmental data on said displayed navigation routing at the appropriate geographical trip point corresponding to said environmental data, each said appropriate geographical point based upon said received geographical position data pertaining to said point.

2. The method of claim 1 wherein said navigational displaying is on a mobile device, and wherein said method further comprises:

providing a geographical position of said mobile device to said at least one transmitting device such that said received environmental data is tailored to said geographical position.

3. The method of claim 1 further comprising:

adjusting said environmental condition data for the time of arrival of said mobile device at each said point.

4. The method of claim 1 wherein said navigational displaying is within a terrestrial vehicle, and wherein said method further comprises:

providing said environmental condition data for an estimated time of arrival of said vehicle at each said location as determined by an anticipated speed of said vehicle along said routing.

5. The method of claim 1 wherein said environmental conditions are selected from the list of: weather, road conditions, traffic conditions, speed limits, repair crews, construction.

6. The method of claim 1 wherein said displayed navigational routing is a medium printed from a computer, and wherein said method further comprises:

adjusting said environmental condition data for the time of arrival at each said point of a traveler moving along said route.

7. The method of claim 5 wherein said environmental conditions are delivered from a communication device associated with environmental sensors pre-positioned at said certain points.

8. The method of claim 1 wherein said environmental sensor comprises a speed limit notification.

9. The method of claim 1 wherein said environmental sensor comprises current traffic conditions.

* * * * *